United States Patent [19]

Nagashima et al.

[11] Patent Number: 4,493,400
[45] Date of Patent: Jan. 15, 1985

[54] EMERGENCY BRAKING DEVICE FOR CHAIN SAW

[75] Inventors: Akira Nagashima, Kawasaki; Yasuo Saito, Fujisawa, both of Japan

[73] Assignee: Kioritz Corporation, Tokyo, Japan

[21] Appl. No.: 365,654

[22] Filed: Apr. 5, 1982

[30] Foreign Application Priority Data

Apr. 13, 1981 [JP] Japan .................................. 56-54417

[51] Int. Cl.³ ...................... F16D 49/04; B23D 57/02
[52] U.S. Cl. .................................... 188/77 W; 30/381
[58] Field of Search ................ 188/77 R, 77 W, 174, 188/166; 30/381, 382, 383

[56] References Cited

U.S. PATENT DOCUMENTS

| | | | |
|---|---|---|---|
| 3,923,126 | 12/1975 | Bidanset | 188/77 W |
| 3,937,306 | 2/1976 | Naslund et al. | 186/166 |
| 3,991,469 | 11/1976 | Frederickson | 188/77 R |
| 4,121,339 | 10/1978 | Nikolich | 188/77 R |
| 4,290,512 | 9/1981 | Zindler | 192/1 |
| 4,324,045 | 4/1982 | Hoppner et al. | 30/381 |

Primary Examiner—Bruce H. Stoner, Jr.
Assistant Examiner—Alvin E. Oberley
Attorney, Agent, or Firm—Karl W. Flocks; Sheridan Neimark; A. Fred Starobin

[57] ABSTRACT

An emergency braking device for a chain saw having a clutch drum drivingly connected to the engine crank shaft through a centrifugal clutch. The emergency braking device includes a braking band wound around the clutch drum and connected at its one end to a stationary part of the chain saw. The other end of the braking band is connected to an actuator having a lever member. The emergency braking device further includes a hit switch member adapted to be rotated when hit by an inertia action of an inertia member disposed in the vicinity of a front handle so as to surround the lever member. As a kick-back takes place in the chain saw, the inertia member hits the hit switch member which in turn drives the lever member to actuate the actuator thereby to tighten the braking belt to quickly brake the clutch drum.

2 Claims, 3 Drawing Figures

EMERGENCY BRAKING DEVICE FOR CHAIN SAW

BACKGROUND OF THE INVENTION

The present invention relates to an emergency braking device for chain saw. Usually, chain saws provided with an emergency braking device are provided with a hand protector which is connected to the engine body and separate from a front handle of the chain saw via vibration damping means. Therefore, the protector and the handle are vibrated at different frequencies and amplitudes to impart an unpleasant feel to the user.

SUMMARY OF THE INVENTION

Accordingly, an object of the invention is to provide a simplified and highly reliable emergency braking device capable of responding to any kick-back phenomenon of the chain saw at a high sensitivity and in a short period of time.

To this end, according to the invention, there is provided an emergency braking device for chain saw comprising an inertia member constituted by a protector member rotatably mounted on a front handle of the chain saw, and a spring-loaded hit switch member rotatably mounted on a portion of the inertia member, whereby the chain saw is automatically braked through the action of a lever member. The hit switch member can be operated also by hand. Since the protector member is mounted unitarily on the front handle, the difference in frequency and amplitude of the vibration between the handle and the protector member is reduced to eliminate unpleasant feel or pain even when a portion of the user's hand happens to contact the protector member.

DESCRIPTION OF THE PREFERRED EMBODIMENT

Figure 1:
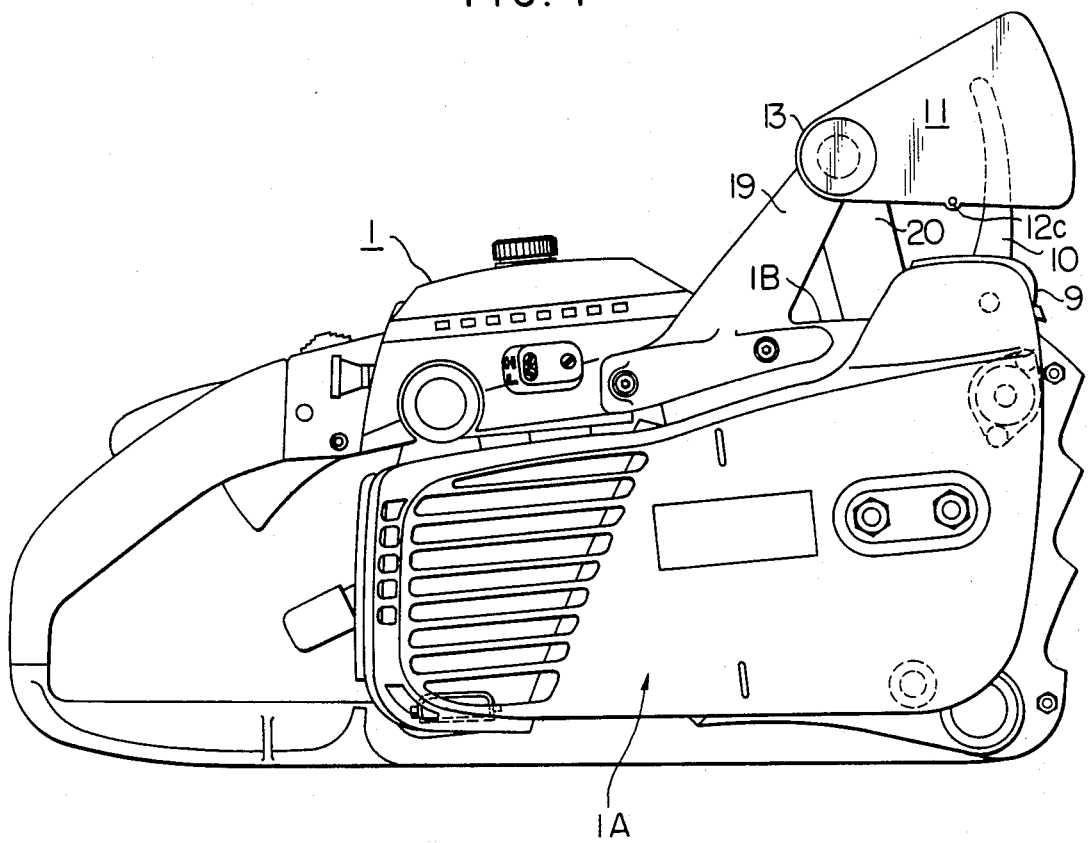
FIG. 1 is a side elevational view of a chain saw constructed in accordance with an embodiment of the invention.

A preferred embodiment of the invention will be described hereinunder with reference to the accompanying drawings.

A chain saw generally designated at a reference numeral 1 has a saw chain guide bar B attached to one side of the front portion thereof. An engine crank shaft 2 projects to the rear part of the saw chain guide bar B. A centrifugal clutch is secured to the engine crank shaft 2. The centrifugal clutch has a clutch drum 3 which is integral with a chain driving sprocket 4 around which a saw chain 5 is wound to slidingly run along the saw chain guide bar B. A braking band 6 is wound around the outer periphery of the clutch drum 3. The braking band 6 is fixed at its one end 7 to a side wall 9 provided on a portion of the engine body and at its other end 8 to an actuating member 16. The actuating member 16 is pivotable around the shaft 15 to tightly squeeze and brake the clutch drum 3.

A lever member 10 is pivotally supported by a shaft 17 and operatively contact at its one end with the actuating member 16. The lever member 10 normally holds the actuating member 16 in the position to slack the braking belt 6, i.e. in the position for releasing the clutch drum 3. A spring 18 is provided to hold the belt 6 and the lever member 10 at predetermined positions. As the lever member 10 is inclined forwardly, the actuating member 16 is rotated by the spring 18 to tighten the braking belt 6 thereby to brake the clutch drum 3.

Figure 2:
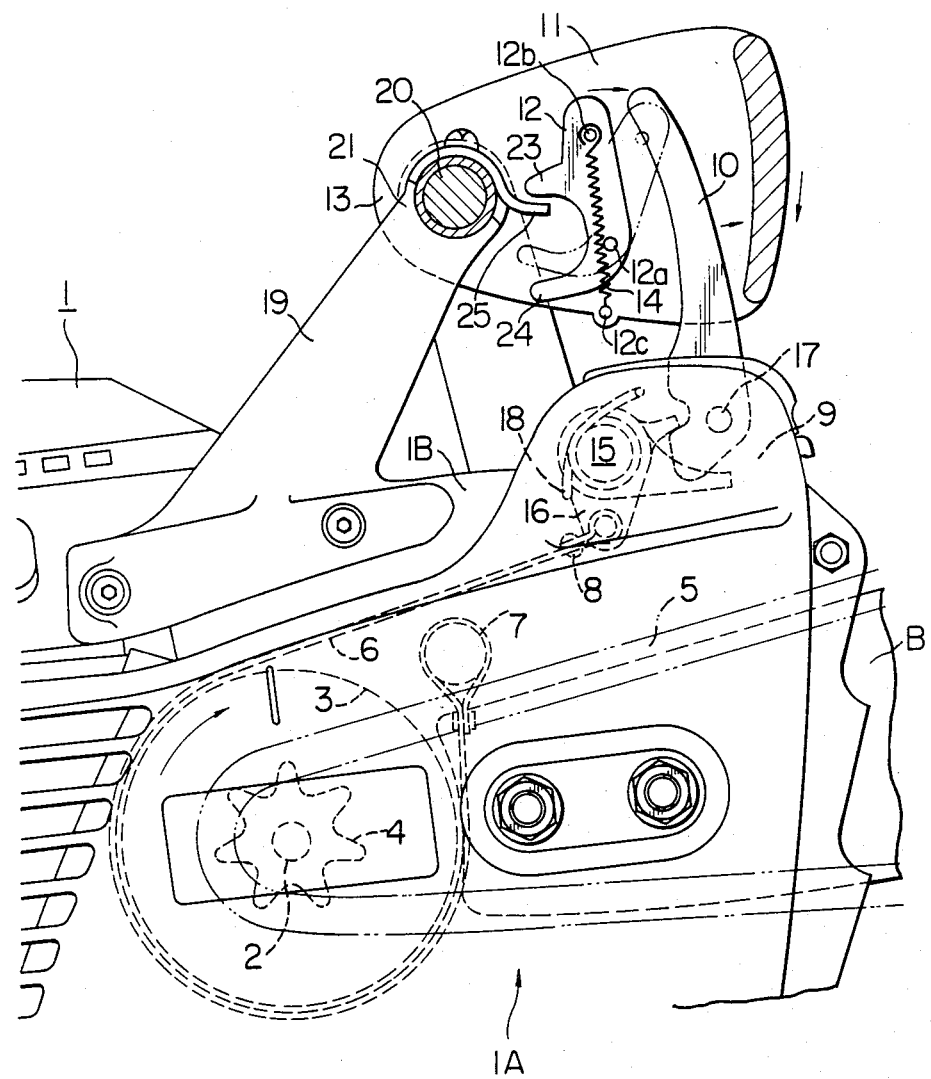
FIG. 2 is a side elevational view of an essential part of the chain saw shown in FIG. 1.
Figure 3:
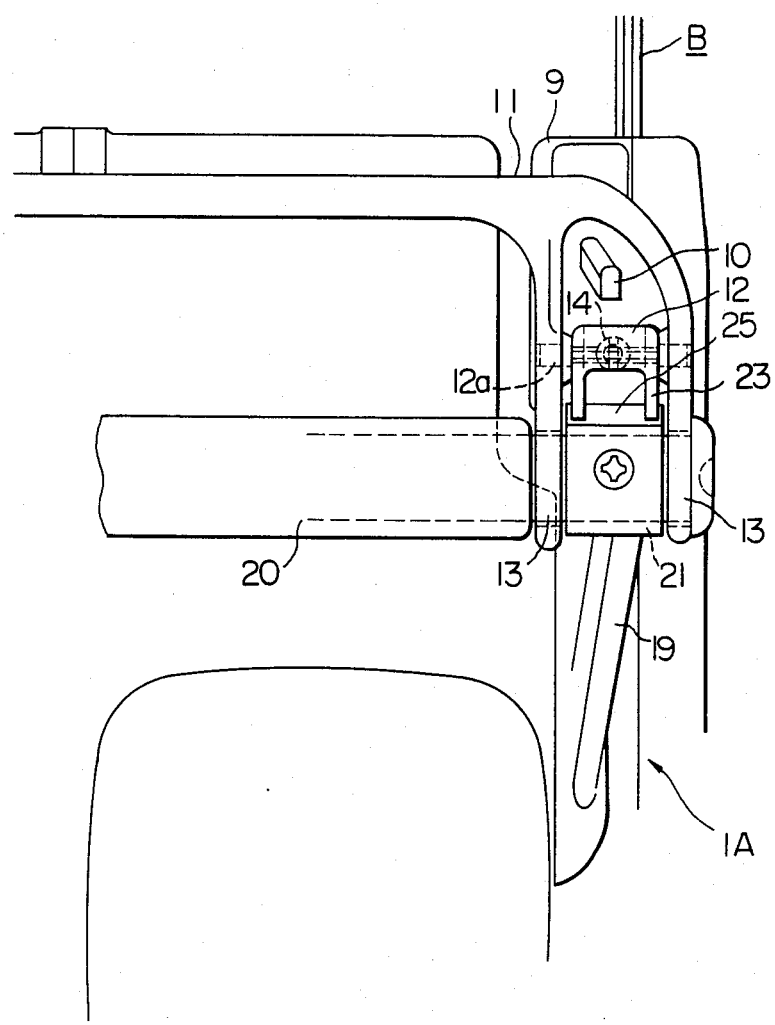
FIG. 3 is a plan view of the essential part shown in FIG. 2.

A frame member 1B supports the engine section 1A of the chain saw 1 through the medium of vibration damping means. A front handle pillar 19 is secured to one side of upper portion of the frame member 1B, and supports one end of a front handle 20. An inertia member 11 designed as a hand protector has one end which is bifurcated into two fingers 13, 13 rotatably secured to the handle 20 at both sides of the bearing portion 21 of the front handle pillar 19. The inertia member 11 is projected to extend forwardly of the front handle 20. Thus, the inertia member 11 is rotatable up and down around the axis of the front handle 20. A pivot shaft 12a connected between two fingers 13, 13 of the inertia member 11 pivotally carries a hit switch member 12. As will be seen from FIG. 2, a hit spring 14 is stretched between a rockable end retainer pin 12b on the switch member 12 and a retainer pin 12c provided on the fingers 13, 13 of the inertia member 11, such that the retainer pins 12b and 12c are arrayed in a straight line. This straight line constitutes a dead point line to either side of the pivot shaft 12a, so that the hit switch member 12 is tiltable to effect the switching operation. The hit switch member 12 is provided with projections 23 and 24 for reciprocating operation thereof. A stopper plate 25 fixed to the front handle 20 is adapted to be selectively engaged by these projections 23 and 24.

According to this arrangement, it is possible to shorten the time required for the emergency stop of the saw chain 5, as will be understood from the following description. Namely, a kick-back action makes the body of the chain saw 1 jump up strongly, so that the inertia member 11 is rotated due to its inertia in the clockwise direction as viewed in FIG. 2 around the axis of the handle 20. In consequence, the relative position of the inertia member 11 to the handle axis is lowered to cause the projection 23 of the hit switch member 12 to be pushed up by the stopper plate 25, so that the hit switch member 12 is tilted in the clockwise direction. As a result, the rockable end of the hit switch member 12 hits the end portion of the lever member 10, so that the lever member 10 is rotated around the shaft 17 while declining forwardly to release the actuating member 16 thereby to tighten the braking belt 6 by the force of the spring 18 on the periphery of the clutch drum 3. In consequence, the chain driving sprocket 4 integral with the clutch drum 3 is forcibly stopped to stop the saw chain 5.

The time required until the saw chain 5 is stopped depends solely on the mechanical gaps. In this respect, the emergency braking device of the invention is quite different from the prior art in which the kick-back action causes an impact on a sensing lever which is used in place of the lever member 10 of the invention by the hand of the user.

In resetting the inertia member 11, the inertia member 11 is simply pushed upwardly so that the hit switch member 12 is pressed downwardly because the projection 24 is positioned in the close proximity of the stopper plate 25, so that the hit switch member 12 is rotated in the counter-clockwise direction to cause the hit spring 14 once stretched and then tilted to the left beyond the dead point line. In consequence, the hit switch member 12 is reset to the starting position where the projection 23 abuts the stopper plate 25, leaving the lever member 10. Meanwhile, the actuating member 16 is rotated clockwise by the counter-clockwise operation of the lever member 10, so that the braking belt 6 releases the clutch drum 3.

The present invention offers another advantage. Namely, it is possible to effect the above described braking operation manually, simply by tilting the hit switch member forwardly. Thus, the emergency braking device of the invention can operate both automatically and manually. In addition, the emergency braking device of the invention can operate without fail, because the threshold of operation is determined solely mechanically.

As has been described, according to the invention, it is possible to obtain an emergency braking device for chain saw, capable of operating safely and without fail while shortening the time required until the chain saw is stopped.

What is claimed is:

1. In a chain saw having a clutch drum (3) drivingly connected to a crank shaft (2) of an engine through a centrifugal clutch, and an emergency braking device, said braking device comprising: a braking band (6) wound around said clutch drum (3), said braking band (6) having one end fixed to the body of said chain saw; an actuating means (16) to which the other end of said braking band is fixed; an inertia member (11) disposed in the vicinity of a front handle (20) of said chain saw and surrounding a lever member (10) of said actuating means (16); a coil spring (18) for holding said braking band (6) and said lever member (10) at predetermined positions; a hit spring (14) overcoming the resistance of said coil spring (18) and causing the pivoting of said lever member (10) to tighten said braking band (6); a hit switch member (12) pivoted on said inertia member (11) adapted to hit said lever member (10); and a stopper plate (25) fixed to said front handle (20) for pushing said hit switch member (12); the pivoting of said hit switch member (12) being initiated by the inertia action of said inertia member (11) and being completed by the action of said hit spring (14) whereby said braking band (6) is tightened by the action of said lever member (10) to brake said clutch drum (3).

2. The chain saw of claim 1 wherein the emergency braking device further comprises said hit spring connected between said inertia member and a point on said hit switch member and spaced on opposite sides of a pivot point of said hit switch member on said inertia member forming a dead point center line substantially over said pivot point.

* * * * *